Feb. 7, 1956          R. H. VOIGT          2,733,698
CARBURATION SYSTEM FOR INTERNAL-COMBUSTION ENGINES
Filed Sept. 24, 1954          2 Sheets-Sheet 1
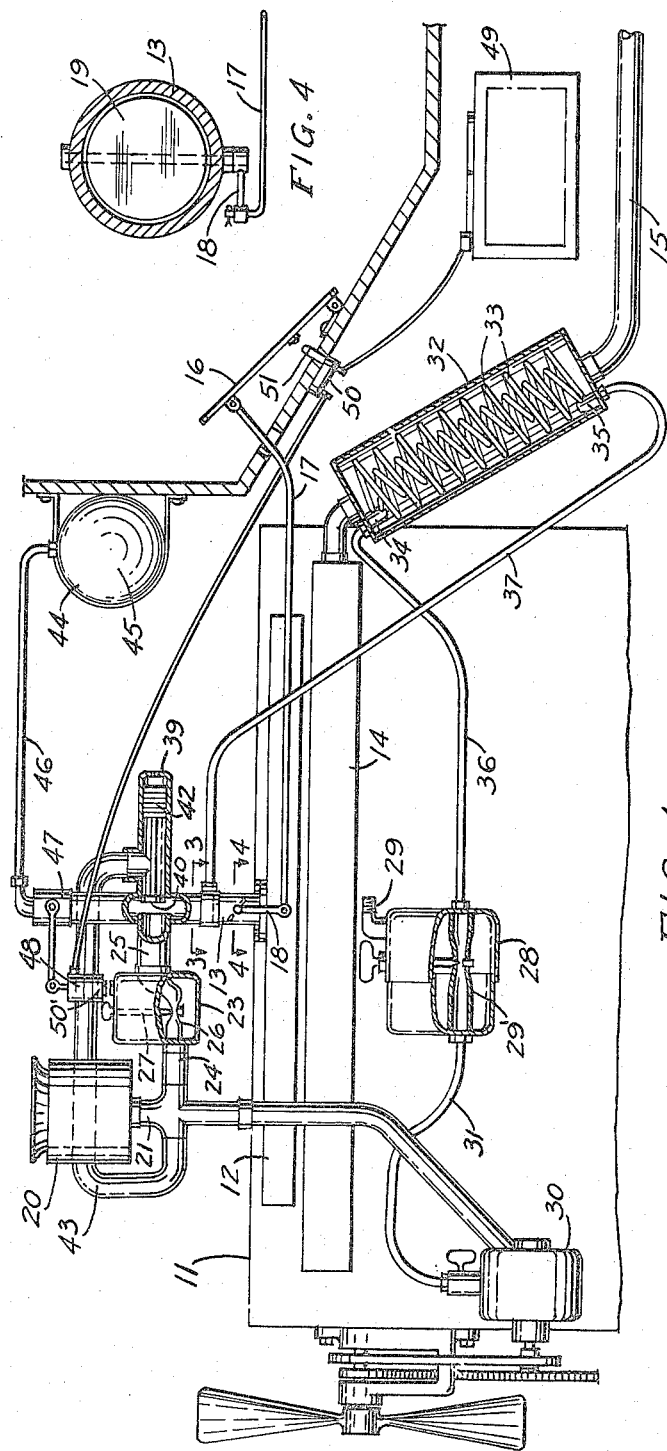
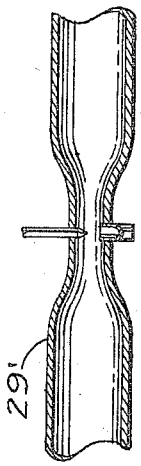
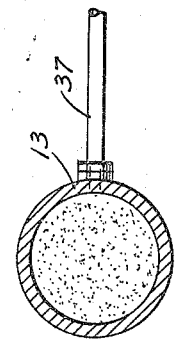
ROBERT H. VOIGT
INVENTOR.
BY
McMorrow, Berman & Davidson
ATTORNEYS

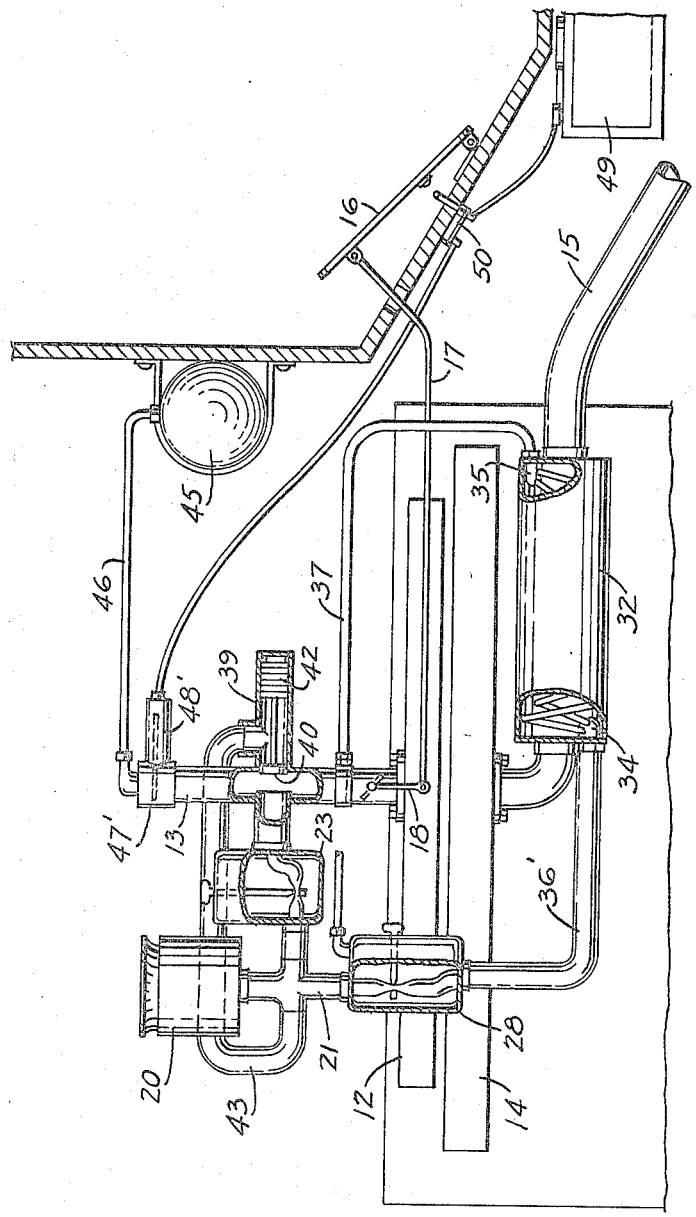

United States Patent Office 2,733,698
Patented Feb. 7, 1956

2,733,698

CARBURATION SYSTEM FOR INTERNAL-COMBUSTION ENGINES

Robert H. Voigt, Milford, Mich.

Application September 24, 1954, Serial No. 458,077

3 Claims. (Cl. 123—127)

This invention relates to internal combustion engines, and more particularly to an improved fuel supply system for an internal combustion engine.

A main object of the invention is to provide a novel and improved carburetion system for an internal combustion engine, said system involving relatively simple components, being reliable in operation, and providing the proper mixture for economical fuel consumption while at the same time providing a means for obtaining increased power for acceleration when required.

A further object of the invention is to provide an improved fuel supply system for an internal combustion engine, said system involving inexpensive parts, being arranged so that a minimum amount of maintenance is required to maintain the system in operating condition, providing easy starting, and being arranged so that maximum fuel economy is obtained while the engine is in normal operation, means being provided for furnishing an auxiliary supply of fuel to the engine whenever acceleration is desired.

Further objects and advantages of the invention will become apparent from the following description and claims, and from the accompanying drawings, wherein:

Figure 1 is a side elevational view, partly in vertical cross section, of a portion of an internal combustion engine provided with an improved carburetion system constructed in accordance with the present invention;

Figure 2 is an enlarged longitudinal vertical cross sectional view taken through the venturi passage of one of the carburetors employed in the system of Figure 1;

Figure 3 is an enlarged horizontal cross sectional view taken on line 3—3 of Figure 1;

Figure 4 is an enlarged horizontal cross sectional view taken on line 4—4 of Figure 1; and Figure 5 is a side elevational view, similar to Figure 1, of a portion of an internal combustion engine provided with a modified form of carburetion system according to the present invention.

Referring to the drawings, and more particularly to Figures 1 to 4, 11 generally designates a conventional internal combustion engine having an intake manifold 12 to which is connected the fuel intake conduit 13. The engine 11 is further provided with the exhaust manifold 14 to which is connected the tail pipe 15. The engine 11 is mounted in the usual manner on the chassis of a vehicle, said vehicle being provided with the accelerator pedal 16 which is connected by a link rod 17 to the throttle arm 18, said throttle arm 18 being connected to the rotary throttle valve 19 mounted in the fuel intake conduit 13.

Designated at 20 is an air filter which is mounted on the top end of an air intake conduit 21, the air intake conduit 21 being suitably mounted adjacent the engine 11. The air intake conduit 21 is connected to the fuel intake conduit 13 through a first carburetor 23, as shown. Conduit 21 is connected to the intake portion of the carburetor 23 by a conduit 24, and the outlet of the carburetor 23 is connected to the fuel intake conduit 13 by a conduit 25, as shown. The carburetor 23 is provided with the usual venturi portion 26 which contains an adjustable needle valve 27 and which is suitably connected to the fuel tank of the vehicle to provide a supply of liquid fuel for admission into the venturi portion 26 of the carburetor in a conventional manner. As will be readily understood, the fuel is vaporized and mixes with air in the carburetor, thus being delivered to the fuel intake conduit 13 and being admitted to the intake manifold 12.

Designated at 28 is a second carburetor which is mounted in a suitable manner adjacent the engine 11 and which is connected to the fuel tank of the vehicle in a manner similar to the connection of the first carburetor 23, as by a conduit connected to the fuel inlet fitting 29 of the carburetor. The air conduit 21 is connected to the inlet side of the venturi 29' of carburetor 28 through an air pump 30. As shown, the air conduit 21 is connected to the intake of the pump 30, and the outlet of the pump is connected by a conduit 31 to the air inlet of the carburetor 28.

Designated at 32 is a heat exchanger which is mounted in heat-receiving relation with respect to the exhaust manifold 14, as by being mounted around the tail pipe 15. As shown in Figure 1, the heat exchanger 32 may comprise a housing secured around the tail pipe 15 adjacent the exhaust manifold 14, said housing containing a plurality of coiled conduits 33 surrounding said tail pipe. The conduits 33 are connected to an intake fitting 34 at one end and to an outlet fitting 35 at the other end, as shown. The outlet portion of the venturi 29 of the carburetor 28 is connected to the inlet fitting 34 by a conduit 36. The outlet fitting 35 of the heat exchanger is connected to the fuel intake conduit 13 by a tubular conduit 37, the connection of conduit 37 to conduit 13 being located between the connection of conduit 25 to conduit 13 and the location of the choke valve 19 therein.

As shown in Figure 1, the conduit 25 is horizontally arranged and projects a short distance into the conduit 13. Secured to the conduit 13 opposite conduit 25 and in alignment therewith is a tubular housing 39. Slidably mounted in the tubular housing 39 is the piston valve 40 which is connected to and controlled by a normally contracted, thermally expansible coil 42 secured in the end portion of housing 39, as shown. When the coil 42 is elevated in temperature by a predetermined amount, corresponding to the normal rise in temperature of the engine 11 when it is placed in operation, the coil 42 expands to move the piston 40 into sealing engagement with the end of the conduit 25, disconnecting the conduit 25 from the fuel intake conduit 13. However, when the engine is cold, the coil 42 is contracted, whereby conduit 25 is in communication with conduit 13.

Designated at 43 is a cross-over conduit connecting the air conduit 21 with the intermediate portion of the tubular housing 39, as illustrated, whereby an extra supply of air may at times be admitted into conduit 13.

Designated at 44 is an auxiliary tank which is suitably mounted in the engine compartment, or in any other convenient location, the tank 44 containing a supply of readily combustible fuel, such as butane, or the like, for example. The tank 45 is connected to the top end of the fuel intake conduit 13 by a conduit 46 through a normally closed valve 47 which is controlled by a solenoid 48. The solenoid 48 is connected to the vehicle battery 49 through a normally open switch 50, said switch having an actuating button 51 located beneath the rear portion of the pedal 16, as shown. When the pedal 16 is depressed through a substantial angle, as when the engine is to be started, or when substantial acceleration is required for the engine, the button numeral 51 is depressed, closing the switch 50, whereby the solenoid 48 is energized and causes the valve 47 and a normally closed valve 50' in conduit 43 to be opened, allowing the butane or similar readily combustible fuel to be admitted into the top end of the fuel intake conduit 13. The auxiliary fuel is mixed either with the air-fuel mixture from conduit 25 or with air from conduit 43, depending from the position of the piston valve 40, or with the air-fuel mixture and air from both conduits if said piston valve 40 is in an intermediate position. Thus, the auxiliary fuel from tank 45 may be employed to assist in starting the engine, for example, under conditions where the temperature is low so that vaporization of the normal fuel is difficult, or may be employed to provide additional acceleration when required.

When the engine is started, the auxiliary fuel from the tank 45, mixed with air, enters the intake manifold 12, along with the fuel mixture from the carburetor 23 when the pedal 16 is depressed sufficiently to close switch 50, as above described, allowing the engine to be started easily. When the pedal 16 is released, the engine 11 is operated by fuel mixture from the conduit 25, as well as by some additional fuel mixture from the second carburetor 28, although under starting conditions, when the engine is cold, very little fuel mixture passes through the heat exchanger coils 33 since the tail pipe 15 is at a relatively low temperature, whereby the fuel tends to deposit on the inside surfaces of the tubes 33 rather than to flow therethrough.

After the engine has been in operation sufficiently to elevate its temperature substantially to its normal operating value, the fuel mixture from the carburetor 28 flows steadily through the heat exchanger 32 and is fully vaporized and pre-heated by said heat exchanger, the heated fuel mixture then passing into the fuel intake conduit 13 through the conduit 37. The elevation in temperature of the engine 11 causes the coil 42 to expand, whereby the piston 40 sealingly engages the end of the conduit 25 and thus disconnects carburetor 23 from the fuel intake conduit 13 as soon as the engine temperature has risen to its normal operating value. During the interim period, fuel mixture will be furnished to the fuel intake conduit 13 from both carburetors 23 and 28, the amount of fuel from the carburetor 28 gradually increasing until a point is reached where the piston valve 40 closes, after which the normal fuel requirements of the engine will be taken care of by carburetor 28. When additional acceleration is required, the auxiliary tank 45 may be employed to provide extra, readily combustible fuel, by the depression of the pedal 16 and closure of switch 50 in the manner above described.

In the form of the invention shown in Figure 5, the air pump 30 is omitted and the air conduit 21 is connected directly to the second carburetor 28. The outlet of the carburetor 28 is connected by a conduit 36' of substantially greater diameter than the conduit 36 in Figure 1, to the inlet fitting 34 of the heat exchanger 32. As in the previously described form of the invention, the auxiliary fuel tank 45 is connected to the fuel intake conduit 13 through a normally closed valve 47' which is controlled by a solenoid 48', said solenoid being normally energized and being energized by the closure of the switch 50, as in the previously described form of the invention.

In the form of the invention shown in Figure 1, the solenoid 48 also controls a valve which is provided in the cross-over conduit 43, the valve, shown at 50' in Figure 1, being normally closed and being open only when the solenoid 48 is energized. Thus, air is supplied to the housing 39 from the conduit 43 only when the valve 47 is opened, namely, only when the auxiliary fuel from tank 45 is admitted to the conduit 13. When the engine is cold, namely, when the coil 42 is in its contracted condition, shown in Figure 1, the piston valve 40 closes off the conduit 39, whereby only air from the conduit 25 is admitted to the conduit 13 along with the combustible fuel from tank 45 under these conditions. The fuel mixture under starting conditions is thus comparatively rich.

However, when the piston valve 40 is extended, as when the engine is operating at normal operating temperature, the housing 39 is in communication with the conduit 13. If switch 50 is closed under these conditions, as when the operator of the vehicle desires to accelerate and depresses the pedal 16 a substantial amount, the auxiliary supply of fuel from the tank 45 admitted through the valve 47 is mixed with a larger quantity of air, since the valve 50' is open and allows air to flow from the air conduit 21 into housing 39, whereby the proper mixture of air and auxiliary fuel is obtained for efficient combustion under these operating conditions. In the form of the invention shown in Figure 5, the valve 47' is directly operated by the solenoid 48' and there is no valve employed in the cross-over conduit 43.

While certain specific embodiments of an improved carburation system for an internal combustion engine has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an internal combustion engine, a fuel intake manifold, an exhaust conduit, an air intake conduit, a heat exchanger in heat-receiving relation to said exhaust conduit, a first carburetor connected between said fuel intake manifold and air intake conduit, a second carburetor connected between said air intake conduit and said heat exchanger, a fuel supply conduit connected between said heat exchanger and said fuel intake manifold, heat-responsive valve means in said fuel intake manifold arranged to disconnect said first carburetor from said fuel intake manifold responsive to a predetermined rise in temperature of the fuel in said fuel supply conduit, an auxiliary source of readily combustible fuel, conduit means connecting said auxiliary source to said fuel intake manifold, throttle means operatively connected to said fuel intake manifold, and normally closed valve means in said last-named conduit means controlled by said throttle means, said last-named valve means being opened when said throttle means is operated to a substantially fully open position.

2. In an internal combustion engine, a fuel intake manifold, an exhaust conduit, an air intake conduit, a heat exchanger in heat-receiving relation to said exhaust conduit, a first carburetor connected between said fuel intake manifold and air intake conduit, a second carburetor connected between said air intake conduit and said heat exchanger, a fuel supply conduit connected between said heat exchanger and said fuel intake manifold, heat-responsive valve means in said fuel intake manifold arranged to disconnect said first carburetor from said fuel intake manifold responsive to a predetermined rise in temperature of the fuel in said fuel supply conduit, an auxiliary source of readily combustible fuel, conduit means connecting said auxiliary source to said fuel intake manifold, throttle means operatively connected to said fuel intake manifold, normally closed valve means in said last-named conduit means controlled by said throttle means, said last-named valve means being opened when said throttle means is operated to a substantially fully open position, and pump means connected between said air intake conduit and said second carburetor.

3. In an internal combustion engine, a fuel intake manifold, an exhaust conduit, an air intake conduit, a heat exchanger in heat-receiving relation to said exhaust conduit, a first carburetor connected between said fuel intake manifold and air intake conduit, a second carburetor connected between said air intake conduit and said heat exchanger, a fuel supply conduit connected between said heat exchanger and said fuel intake manifold, heat-responsive valve means in said fuel intake manifold arranged to disconnect said first carburetor from said fuel intake manifold responsive to a predetermined rise in temperature of said fuel supply conduit, an auxiliary source of readily combustible fuel, auxiliary conduit means connecting said auxiliary source to said fuel intake manifold, an auxiliary air conduit connecting said air intake conduit to said fuel intake manifold, throttle means operatively connected to said fuel intake manifold, and normally closed valve means in said auxiliary conduit means and auxiliary air conduit controlled by said throttle means, said last-named valve means being opened when said throttle means is operated to a substantially fully open position.

References Cited in the file of this patent

UNITED STATES PATENTS

| | | |
|---|---|---|
| 1,304,888 | Kenneweg | May 27, 1919 |
| 1,323,456 | Decker | Dec. 2, 1919 |
| 2,098,178 | Corse | Nov. 2, 1937 |
| 2,163,241 | Huber | June 20, 1939 |